(12) United States Patent
Germer et al.

(10) Patent No.: US 11,316,542 B2
(45) Date of Patent: Apr. 26, 2022

(54) SIGNAL ANALYSIS METHOD AND SIGNAL ANALYSIS MODULE

(71) Applicant: Rohde & Schwarz GmbH & Co. KG, Munich (DE)

(72) Inventors: Annika Germer, Munich (DE); Susanne Hirschmann, Munich (DE); Jochen Pliquett, Munich (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 0 days.

(21) Appl. No.: 16/989,384

(22) Filed: Aug. 10, 2020

(65) Prior Publication Data

US 2022/0045699 A1     Feb. 10, 2022

(51) Int. Cl.
*H04L 5/12* (2006.01)
*H04L 23/02* (2006.01)
*H04B 1/00* (2006.01)

(52) U.S. Cl.
CPC ......... *H04B 1/0042* (2013.01); *H04B 1/0035* (2013.01); *H04B 1/0039* (2013.01)

(58) Field of Classification Search
CPC ... H04B 1/0042; H04B 1/0039; H04B 1/0035
USPC ....................................................... 375/262
See application file for complete search history.

(56) References Cited

U.S. PATENT DOCUMENTS

| | | | |
|---|---|---|---|
| 6,993,440 B2 | 1/2006 | Anderson et al. | |
| 2017/0155476 A1* | 6/2017 | Polehn | H04L 1/1835 |
| 2018/0074096 A1 | 3/2018 | Absher et al. | |
| 2019/0274112 A1* | 9/2019 | Kleinbeck | H04W 64/00 |
| 2020/0328916 A1* | 10/2020 | Nikitin | H03M 3/462 |

FOREIGN PATENT DOCUMENTS

| | | |
|---|---|---|
| DE | 102017129168 A1 | 6/2019 |
| EP | 1729471 A1 | 12/2006 |
| EP | 2375663 A1 | 10/2011 |
| FR | 2713799 A1 | 6/1995 |
| KR | 100414362 B1 * | 1/2004 |

* cited by examiner

*Primary Examiner* — Tanmay K Shah
(74) *Attorney, Agent, or Firm* — Christensen O'Connor Johnson Kindness PLLC

(57) ABSTRACT

A signal analysis method is described. The signal analysis method includes: receiving an input signal having unknown characteristic signal parameters; determining IQ data being associated with the input signal; determining at least one of the characteristic signal parameters based on the IQ data via an artificial intelligence circuit; and adapting at least one measurement parameter of a measurement instrument based on the at least one characteristic parameter by the artificial intelligence circuit. Moreover, a signal analysis circuit is described.

19 Claims, 4 Drawing Sheets

SIGNAL ANALYSIS METHOD AND SIGNAL ANALYSIS MODULE

FIELD OF THE DISCLOSURE

Embodiments of the present disclosure generally relate to a signal analysis method. Embodiments of the present disclosure further relate to a signal analysis module.

BACKGROUND

In order to perform a correct signal analysis, e.g. a vector signal analysis using IQ-based measurement applications, details about certain properties of the signal to be analyzed need to be known.

The knowledge of these details is necessary as the corresponding measurement instrument or measurement application needs to be set to the correct operational mode for the particular signal that is to be analyzed.

Usually, a user of the measurement instrument or of the measurement application needs to set the corresponding operational mode by hand. If the properties of the signal to be analyzed are unknown, the user may follow a procedure described in an operating manual of the measurement instrument or of the measurement application in order to determine the relevant properties of the signal to be analyzed.

However, this process of manually recovering the signal properties may be rather time-consuming, and requires detailed knowledge of the measurement instrument or of the measurement application.

US 2018/0074096 A1, which is incorporated by reference in its entirety, discloses an oscilloscope that is configured to classify an input signal with regard to its signal amplitude characteristics and with regard to its time related characteristics, namely by taking the waveform of the input signal into account. For example, the oscilloscope is configured to classify the input signal with regard to a maximum amplitude, a root mean square, a data rate, a duty cycle, etc. The oscilloscope is further configured to suggest several corresponding functionalities of the oscilloscope to a user based on the classification of the input signal by displaying the functionalities on a display of the oscilloscope. The user may then select one of the several suggested functionalities. However, the user needs knowledge concerning the respective impact of the suggested functionalities as well as the respective settings associated therewith. Therefore, only experienced users are enabled to use the oscilloscope correctly.

There is a need for a signal analysis method and for a signal analysis module that allow for a simplified signal analysis if the properties of the signal to be analyzed are unknown.

SUMMARY

Embodiments of the present disclosure provide a signal analysis method. In an embodiment, the signal analysis method comprises the following steps:

receiving an input signal having unknown characteristic signal parameters;

determining IQ data being associated with the input signal;

determining at least one of the characteristic signal parameters based on the IQ data via artificial intelligence circuitry or module; and adapting at least one measurement parameter of a measurement instrument based on the at least one characteristic parameter by the artificial intelligence module.

Therein and in the following, the term "measurement instrument" is understood to denote a suitable combination of hardware and/or software that is configured to analyze the input signal and/or the IQ data associated with the input signal.

For example, the measurement instrument may be established as at least one of an oscilloscope, a vector network analyzer, a (vector) signal analyzer, and a computer with a suitable measurement application containing executable instructions, program code, etc., that when executed by the computer (e.g., one or more computing devices, processors, CPUs, DSPs, etc.) carry out some or all of the functionality described herein.

The term "signal parameters" is understood to denote parameters that describe properties of the input signal itself. Moreover, the term "measurement parameters" is understood to denote corresponding settings of a signal analysis circuit(s) or module, for example of the measurement instrument, that are used in order to measure/analyze the input signal and/or the IQ data associated with the input signal.

In an embodiment, the signal analysis circuit(s) receive input signals, condition the signals, perform signal sampling, and/or digitize the signals and forward the results to memory or processor for analysis. Signal analysis circuit(s) may be implemented as an application specific integrated circuit (ASIC), a digital signal processor (DSP), or other processing circuitry. Signal analysis circuit(s) are coupled to a processor, which may be implemented as a general purpose processor. The processor is configured to execute instructions from the memory and perform any methods and/or associated steps indicated by the instructions. The memory may be implemented as processor cache, random access memory (RAM), read only memory (ROM), solid state memory, hard disk drive(s), or any other memory type. The memory acts as a non-transitory medium for storing computer program products and other instructions, storing waveform samples, and/or storing other data objects such as classifiers, models, etc. The memory provides such stored information to the processor for computation as needed.

The term "artificial intelligence module" is understood to denote a hardware- and/or software module employing artificial intelligence techniques.

Thus, the artificial intelligence module may use classical algorithms and/or machine learning techniques in order to determine the at least one characteristic signal parameter and in order to adapt the at least one measurement parameter of the measurement instrument, for example pattern recognition techniques, image analysis techniques and/or reinforcement learning techniques.

In some embodiments, if the artificial intelligence module is configured for reinforcement learning techniques, the artificial intelligence module acts as an agent, while the measurement instrument is the environment.

Alternatively or additionally, the artificial intelligence module may comprise at least one artificial neural network. Of course, the artificial intelligence module may comprise several (i.e. at least two) artificial neural networks, which may be interconnected with each other.

In an embodiment, the processor or other processing structure or circuit may include an artificial intelligence or machine learning circuit or module. The artificial intelligence module includes a processing circuit and/or set of executing instructions configured to operate machine learning algorithms. For example, the processor and artificial intelligence module may be employed during a learning phase to train data objects, models, etc. Such training may employ training data. The artificial intelligence module is also configured to operate machine learning algorithms. As such, the artificial intelligence module, in some embodiments, is configured to perform one or more method steps described herein. In some embodiments, the artificial intelligence module may also be implemented, in part, in the memory and/or one or more components of the measurement instrument.

In general, two or more measurement parameters of the measurement instrument may be adapted.

The signal analysis method according to the present disclosure is based on the idea to automatically determine relevant parameters of the input signal that are needed for an analysis of the input signal by the artificial intelligence module.

In other words, the artificial intelligence or machine learning module automatically analyzes the input signal having unknown characteristic signal parameters, and automatically determines the unknown characteristic signal parameters that are necessary for a substantive analysis of the input signal by the measurement instrument.

Moreover, the artificial intelligence or machine learning module automatically sets the measurement instrument to the correct operational mode for the analysis of the input signal.

Accordingly, the user of the measurement instruments does not have to go through a potentially time-consuming process of manually recovering the characteristic properties of the input signal having unknown properties. Instead, the characteristic properties of the input signal are recovered automatically and the measurement instrument is automatically set to the correct operational mode. Hence, an unexperienced user is enabled to use the measurement instrument since the analysis of the input signal and the setup of the measurement instrument used to measure the input signal are done automatically without any manual input.

According to the disclosure of US 2018/0074096 A1, the input signal is merely classified and several different operational modes of the oscilloscope are displayed on a display, such that the user may select one of these operational modes suggested. In contrast, and according to the present disclosure, one or several characteristic signal parameters that are necessary for the analysis of the input signal are determined automatically, and the measurement instrument is automatically set to the correct operational mode by adapting the measurement parameter(s) of the measurement instrument. Thus, a completely automatic test procedure is provided by the signal analysis method according to the disclosure.

The at least one characteristic signal parameter may comprise at least one of a modulation type of the input signal, a frequency offset of the input signal, a symbol rate of the input signal, a phase offset of the input signal, a timing offset of the input signal, and a transmit filter being associated with the input signal.

According to an aspect of the present disclosure, at least one of the input signal and the IQ data is transformed to frequency domain, thereby generating a transformed signal. In other words, a spectrum of the input signal and/or a spectrum of the IQ data is determined automatically. This is particularly useful for determining characteristic signal parameters that are associated with frequency properties of the input signal.

For example, at least one of a symbol rate and a frequency offset of the input signal may be determined based on the transformed signal by the artificial intelligence or machine learning module.

According to another aspect of the present disclosure, a local maximum of the transformed signal is determined by the artificial intelligence module in order to determine a symbol rate of the input signal. In general, the spectrum of the input signal or rather the spectrum of the IQ data has a local maximum at a frequency that is equal to the symbol rate of the input signal. Thus, by determining the local maximum of the transformed signal, the symbol rate of the input signal can be determined.

The artificial intelligence module may determine the local maximum by classical algorithms and/or by machine learning techniques, such as pattern recognition, image analysis and/or reinforcement learning.

In some embodiments, an image of the spectrum of the input signal and/or an image of the spectrum of the IQ data may be generated based on the transformed signal, and image analysis techniques may be applied to the generated image in order to determine the local maximum, and thus the symbol rate of the input signal.

According to an aspect of the present disclosure, a modulation type of the input signal is determined directly based on the IQ data by the artificial intelligence module. In other words, the modulation type may be determined directly based on the unprocessed IQ data (or raw IQ data) by the artificial intelligence module. For example, the artificial intelligence module may determine the modulation type of the input signal based on time domain information comprised in the IQ data.

Put differently, the digital modulation type is determined in some embodiments in contrast to prior art techniques such as disclosed in US 2018/0074096 A1 in which only time domain signal types, e.g. pulse width etc., are determined.

In some embodiments, the artificial intelligence module may employ classical algorithms and/or machine learning techniques in order to determine the modulation type of the input signal directly based on the IQ data.

In a further embodiment of the present disclosure, a constellation diagram is determined based on the IQ data, wherein a modulation type of the input signal is determined by the artificial intelligence module. In some embodiments, the modulation type of the input signal is determined based on the constellation diagram determined previously based on the IQ data. In other words, the constellation diagram may be used to determine the modulation type of the input signal. In general, the constellation diagrams for different modulation types are different from each other. By implication, the modulation type of the input signal can be determined based on the constellation diagram.

The artificial intelligence module may employ classical algorithms and/or machine learning techniques in order to determine the modulation type based on the constellation diagram. In some embodiments, the artificial intelligence module may determine the modulation type of the input signal via pattern recognition techniques that are applied to the constellation diagram.

For example, an image may be generated based on the constellation diagram, and an image analysis technique may be applied to the generated image in order to determine the modulation type of the input signal.

According to a further aspect of the present disclosure, a preliminary reference signal is generated based on the at least one characteristic signal parameter, wherein the preliminary reference signal is compared with the input signal in order to adapt the at least one measurement parameter. Thus, if no reference signal is available, e.g. because a device under test is not configured to provide a reference signal, the preliminary reference signal is determined based on the at least one characteristic signal parameter in lieu of the reference signal.

Generally speaking, the preliminary reference signal corresponds to an idealized reconstructed input signal, wherein the input signal is reconstructed based on the determined characteristic signal parameter(s). In other words, the preliminary reference signal is a hypothesis about the input signal without any perturbations. Such perturbations may occur due to non-ideal transfer functions of a signal path of the input signal, a non-ideal behavior of electronic components, thermal noise, etc.

The preliminary reference signal may be generated based on a mathematical model of the input signal, wherein the at least one characteristic signal parameter is a model parameter of the mathematical model. By comparing the preliminary reference signal to the actual input signal, the determined characteristic signal parameters can be verified or falsified.

Alternatively or additionally, the determined characteristic signal parameters may be fine-tuned by comparing the preliminary reference signal to the actual input signal. In other words, the characteristic signal parameters may be varied until the relevant properties (i.e. the characteristic signal parameters) of the preliminary reference signal match the corresponding characteristic signal parameters of the actual input signal.

For example, a suitable metric, for example an error vector magnitude, may be used in order to compare the preliminary reference signal to the actual input signal. In other words, an error vector magnitude of the preliminary reference signal with respect to the actual input signal In some embodiments, the characteristic signal parameters may be determined or rather fine-tuned recursively.

According to another aspect of the present disclosure, the preliminary reference signal is generated based on at least one preliminary modulation type, wherein the constellation diagram is compared against a constellation diagram corresponding to the preliminary reference signal in order to determine the modulation type of the input signal. In other words, the IQ data associated with the input signal is compared against IQ data being associated with the preliminary reference signal in order to determine the modulation type of the input signal.

The at least one preliminary modulation type corresponds to a hypothesis about the actual modulation type of the input signal. By comparing the constellation diagram associated with the preliminary modulation type with the constellation diagram associated with the input signal (which comprises information on the actual modulation type of the input signal), the preliminary modulation type can be verified or falsified.

As already mentioned above, the artificial intelligence module may employ classical algorithms and/or machine learning techniques in order to compare the constellation diagram corresponding to the preliminary modulation type with the constellation diagram being associated with the input signal, for example via pattern recognition techniques, via image analysis techniques and/or via reinforcement learning techniques.

In some embodiments, several different preliminary modulation types or rather the associated constellation diagrams may be compared with the constellation diagram being associated with the input signal. The actual modulation type of the input signal may then be determined by selecting the preliminary modulation type having the smallest deviation from the constellation diagram being associated with the input signal.

In order to determine the deviation of the constellation diagram that is based on the preliminary modulation from the constellation diagram being associated with the input signal, an error vector magnitude (EVM) of the IQ data being associated with the preliminary modulation may be determined with respect to the IQ data being associated with the input signal.

An error signal may be determined based on the input signal and based on the preliminary reference signal, wherein the at least one measurement parameter is adapted based on the error signal. The error signal corresponds to a difference between the input signal and the preliminary reference signal. Thus, the error signal constitutes a measure for the accuracy of the determined characteristic signal parameters. Accordingly, the characteristic signal parameters may be fine-tuned based on the error signal.

After fine-tuning of the characteristic signal parameters, a left-over error signal corresponds to perturbations comprised in the input signal, e.g. perturbations occurring in the signal path of the input signal, perturbations due to non-optimal behavior of a device under test generating the input signal, etc.

In some embodiments, at least one filter parameter of a transmit filter is determined based on the preliminary reference signal. In general, the input signal is generated (e.g. by a device under test) based on a certain transmit filter having certain filter parameters. As already mentioned above, the preliminary reference signal is associated with a mathematical model of the input signal, wherein the transmit filter may be part of that mathematical model. By implication, the model parameters of the mathematical model, for example the filter parameters of the transmit filter, can be determined by comparing the input signal with the preliminary reference signal.

In some embodiments, the at least one filter parameter may be varied such that a deviation of the preliminary reference signal from the actual input signal is minimized.

According to another aspect of the present disclosure, the at least one filter parameter comprises a roll-off factor. Generally, the roll-off factor describes a steepness of signal edges comprised in the input signal. Accordingly, a roll-off factor of a transmit filter being associated with the preliminary reference signal may be varied such that a deviation between the preliminary reference signal and the actual input signal is minimized.

Alternatively or additionally, the roll-off factor may be determined directly based on the input signal and/or based on the IQ data by the artificial intelligence module, for example via suitable machine learning techniques.

In a further embodiment of the present disclosure, an error vector magnitude of the IQ data is determined, wherein the at least one measurement parameter is adapted based on the error vector magnitude by the artificial intelligence module. The error vector magnitude constitutes a measure for the modulation quality of the input signal. Thus, the at least one measurement parameter may be adapted based on the quality of the modulation of the input signal.

The error vector magnitude may be determined based on a (fine-tuned) set of determined characteristic signal parameters and/or based on a preliminary reference signal that is generated based on the (fine-tuned) set of determined characteristic signal parameters.

In some embodiments, the error vector magnitude may be determined based on the error signal described above.

Embodiments of the present disclosure further provide a signal analysis circuit(s) or module. In an embodiment, the signal analysis module comprises an input, a processing circuit or module, and an artificial intelligence or machine learning circuit or module. The input is configured to receive an input signal having unknown characteristic signal parameters. The processing module is configured to determine IQ data being associated with the input signal. The artificial intelligence module is configured to determine at least one of the characteristic signal parameters based on the IQ data. The artificial intelligence module is configured to adapt at least one measurement parameter of a measurement instrument based on the at least one characteristic parameter.

In some embodiments, the signal analysis circuit(s) or module receive input signals, condition the signals, perform signal sampling, and/or digitize the signals and forward the results to, for example, a memory or a processor for analysis. The signal analysis circuit(s) or module may be implemented as an application specific integrated circuit (ASIC), a digital signal processor (DSP), or other processing circuitry. Signal analysis circuit(s) are coupled to processor, which may be implemented as a general purpose processor. The processor is configured to execute instructions from the memory and perform any methods and/or associated steps indicated by the instructions. The memory may be implemented as processor cache, random access memory (RAM), read only memory (ROM), solid state memory, hard disk drive(s), or any other memory type. The memory acts as a non-transitory medium for storing computer program products and other instructions, storing waveform samples, and/or storing other data objects such as classifiers, models, etc. The memory provides such stored information to the processor for computation as needed.

In an embodiment, the processor may include or is associated with the artificial intelligence circuit or module. In an embodiment, the artificial intelligence module includes a processing circuit and/or set of executable instructions configured to operate artificial intelligence and/or machine learning algorithms. For example, the processor and artificial intelligence module may be employed during a learning phase to train data objects, models, etc. Such training may employ training data. The artificial intelligence module is also configured to operate machine learning algorithms. As such, the artificial intelligence module is configured to perform one or more method steps described herein. In some aspects, the artificial intelligence module may also be implemented, in part, in the memory and/or other components of the signal analysis circuit(s) or module, the measurement instrument, etc.

The at least one characteristic signal parameter may comprise at least one of a modulation type of the input signal, a frequency offset of the input signal, a symbol rate of the input signal, a phase offset of the input signal, a timing offset of the input signal, and a transmit filter being associated with the input signal.

Regarding the advantages and further properties of the signal analysis module, reference is made to the explanations given above with regard to the signal analysis method, which also hold for the signal analysis module and vice versa.

In some embodiments, the signal analysis module is configured to perform one or more steps the signal analysis method described above.

According to an aspect of the present disclosure, the processing module is configured to transform at least one of the input signal and the IQ data to frequency domain, thereby generating a transformed signal. In other words, the processing module is configured to determine a spectrum of the input signal and/or a spectrum of the IQ data automatically. This is particularly useful for determining characteristic parameters that are associated with frequency properties of the input signal.

For example, the artificial intelligence module may be configured to determine at least one of a symbol rate and a frequency offset of the input signal based on the transformed signal.

According to another aspect of the present disclosure, the artificial intelligence module is configured to determine a local maximum of the transformed signal in order to determine a symbol rate of the input signal. In general, the spectrum of the input signal or rather the spectrum of the IQ data has a local maximum at a frequency that is equal to the symbol rate of the input signal. Thus, by determining the local maximum of the transform signal, the symbol rate of the input signal can be determined.

The artificial intelligence module may be configured to determine the local maximum by classical algorithms and/or by machine learning techniques, such as pattern recognition, image analysis and/or reinforcement learning.

In some embodiments, the processing module may be configured to generate an image of the spectrum of the input signal and/or an image of the spectrum of the IQ data based on the transformed signal, and the artificial intelligence module may be configured to apply image analysis techniques to the generated image in order to determine the local maximum, and thus the symbol rate of the input signal.

According to an aspect of the present disclosure, the artificial intelligence module is configured to determine a modulation type of the input signal directly based on the IQ data. In other words, the modulation type may be determined directly based on the unprocessed IQ data (or raw IQ data) by the artificial intelligence module. For example, the artificial intelligence module may determine the modulation type of the input signal based on time domain information comprised in the IQ data.

In some embodiments, the artificial intelligence module may employ classical algorithms and/or machine learning techniques in order to determine the modulation type of the input signal directly based on the IQ data.

In a further embodiment of the present disclosure, the processing module is configured to determine a constellation diagram based on the IQ data, wherein the artificial intelligence module is configured to determine a modulation type of the input signal based on the constellation diagram. In general, the constellation diagrams for different modulation types are different from each other. By implication, the modulation type of the input signal can be determined based on the constellation diagram.

The artificial intelligence module may be configured to employ classical algorithms and/or machine learning techniques in order to determine the modulation type based on the constellation diagram. In some embodiments, the artificial intelligence module may be configured to determine the modulation type of the input signal via pattern recognition techniques that are applied to the constellation diagram.

For example, the processing module may be configured to generate an image based on the constellation diagram, and the artificial intelligence module may be configured to apply an image analysis technique to the generated image in order to determine the modulation type of the input signal.

The signal analysis module may further comprise a signal generator circuit or module, the signal generator module being configured to generate a preliminary reference signal based on the at least one characteristic signal parameter, wherein the artificial intelligence module is configured to compare the preliminary reference signal with the input signal in order to adapt the at least one measurement parameter.

Thus, if no reference signal is available, e.g. because a device under test is not configured to provide a reference signal, the signal generator module is configured to determine the preliminary reference signal based on the at least one characteristic signal parameter in lieu of the reference signal.

Generally speaking, the preliminary reference signal corresponds to an idealized reconstructed input signal, wherein the signal generator module is configured to reconstruct the input signal based on the determined characteristic signal parameter(s). In other words, the preliminary reference signal is a hypothesis about the input signal without any perturbations. Such perturbations may occur due to non-ideal transfer functions of a signal path of the input signal, a non-ideal behavior of electronic components, thermal noise, etc.

The signal generator module may be configured to generate the preliminary reference signal based on a mathematical model of the input signal, wherein the at least one characteristic signal parameter is a model parameter of the mathematical model. By comparing the preliminary reference signal to the actual input signal, the determined characteristic signal parameters can be verified or falsified.

Alternatively or additionally, the artificial intelligence module may be configured to fine-tune the determined characteristic signal parameters by comparing the preliminary reference signal to the actual input signal. In other words, the artificial intelligence module may be configured to vary the characteristic signal parameters until the relevant properties (i.e. the characteristic signal parameters) of the preliminary reference signal match the corresponding characteristic signal parameters of the actual input signal.

For example, a suitable metric, for example an error vector magnitude, may be used in order to compare the preliminary reference signal to the actual input signal. In other words, an error vector magnitude of the preliminary reference signal with respect to the actual input signal may be determined.

According to another aspect of the present disclosure, the signal generator module is configured to generate the preliminary reference signal based on at least one preliminary modulation type, wherein the artificial intelligence module is configured to compare the constellation diagram against a constellation diagram corresponding to the preliminary reference signal in order to determine the modulation type of the input signal.

In other words, the artificial intelligence module is configured to compare the IQ data associated with the input signal against IQ data being associated with the preliminary reference signal in order to determine the modulation type of the input signal.

The at least one preliminary modulation type corresponds to a hypothesis about the actual modulation type of the input signal. By comparing the constellation diagram associated with the preliminary modulation type with the constellation diagram associated with the input signal (which comprises information on the actual modulation type of the input signal), the preliminary modulation type can be verified or falsified.

As already mentioned above, the artificial intelligence module may be configured to employ classical algorithms and/or machine learning techniques in order to compare the constellation diagram corresponding to the preliminary modulation type with the constellation diagram being associated with the input signal, for example via pattern recognition techniques, via image analysis techniques and/or via reinforcement learning techniques.

In some embodiments, the artificial intelligence module may be configured to compare several different preliminary modulation types or rather the associated constellation diagrams with the constellation diagram being associated with the input signal. The artificial intelligence module may be configured to determine the actual modulation type of the input signal by selecting the preliminary modulation type having the smallest deviation from the constellation diagram being associated with the input signal.

In order to determine the deviation of the constellation diagram that is based on the preliminary modulation from the constellation diagram being associated with the input signal, the artificial intelligence module may be configured to determine an error vector magnitude (EVM) of the IQ data being associated with the preliminary modulation with respect to the IQ data being associated with the input signal.

The signal analysis module of may further comprise an error circuit or module, wherein the error module is configured to determine an error signal based on the input signal and based on the preliminary reference signal, and wherein the artificial intelligence module is configured to adapt the at least one measurement parameter based on the error signal. The error signal corresponds to a difference between the input signal and the preliminary reference signal. Thus, the error signal constitutes a measure for the accuracy of the determined characteristic signal parameters. Accordingly, the artificial intelligence module may be configured to fine-tune the characteristic signal parameters based on the error signal.

After fine-tuning of the characteristic signal parameters, a left-over error signal corresponds to perturbations comprised in the input signal, e.g. perturbations occurring in the signal path of the input signal, perturbations due to non-optimal behavior of a device under test generating the input signal, etc.

In a further embodiment of the present disclosure, the artificial intelligence module is configured to determine at least one filter parameter of a transmit filter based on the preliminary reference signal. In general, the input signal is generated (e.g. by a device under test) based on a certain transmit filter having certain filter parameters. As already mentioned above, the preliminary reference signal is associated with a mathematical model of the input signal, wherein the transmit filter may be part of that mathematical model. By implication, the model parameters of the mathematical model, for example the filter parameters of the transmit filter, can be determined by comparing the input signal with the preliminary reference signal.

In some embodiments, the artificial intelligence module may be configured to vary the at least one filter parameter such that a deviation of the preliminary reference signal from the actual input signal is minimized.

According to another aspect of the present disclosure, the at least one filter parameter comprises a roll-off factor. Generally, the roll-off factor describes a steepness of signal edges comprised in the input signal. Accordingly, the artificial intelligence module may be configured to vary a roll-off factor of a transmit filter being associated with the preliminary reference signal such that a deviation between the preliminary reference signal and the actual input signal is minimized.

Alternatively or additionally, the artificial intelligence module may be configured to determine the roll-off factor directly based on the input signal and/or based on the IQ data by the artificial intelligence module, for example via suitable machine learning techniques.

According to another aspect of the present disclosure, the processing module is configured to determine an error vector magnitude of the IQ data, wherein the artificial intelligence module is configured to adapt the at least one measurement parameter based on the error vector magnitude. The error vector magnitude constitutes a measure for the modulation quality of the input signal. Thus, the artificial intelligence module may be configured to adapt the at least one measurement parameter adapted based on the quality of the modulation of the input signal.

The artificial intelligence module may be configured to determine the error vector magnitude based on a (fine-tuned) set of determined characteristic signal parameters and/or based on a preliminary reference signal that is generated based on the (fine-tuned) set of determined characteristic signal parameters.

In some embodiments, the artificial intelligence module may be configured to determine the error vector magnitude based on the error signal described above.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

Figure 1:
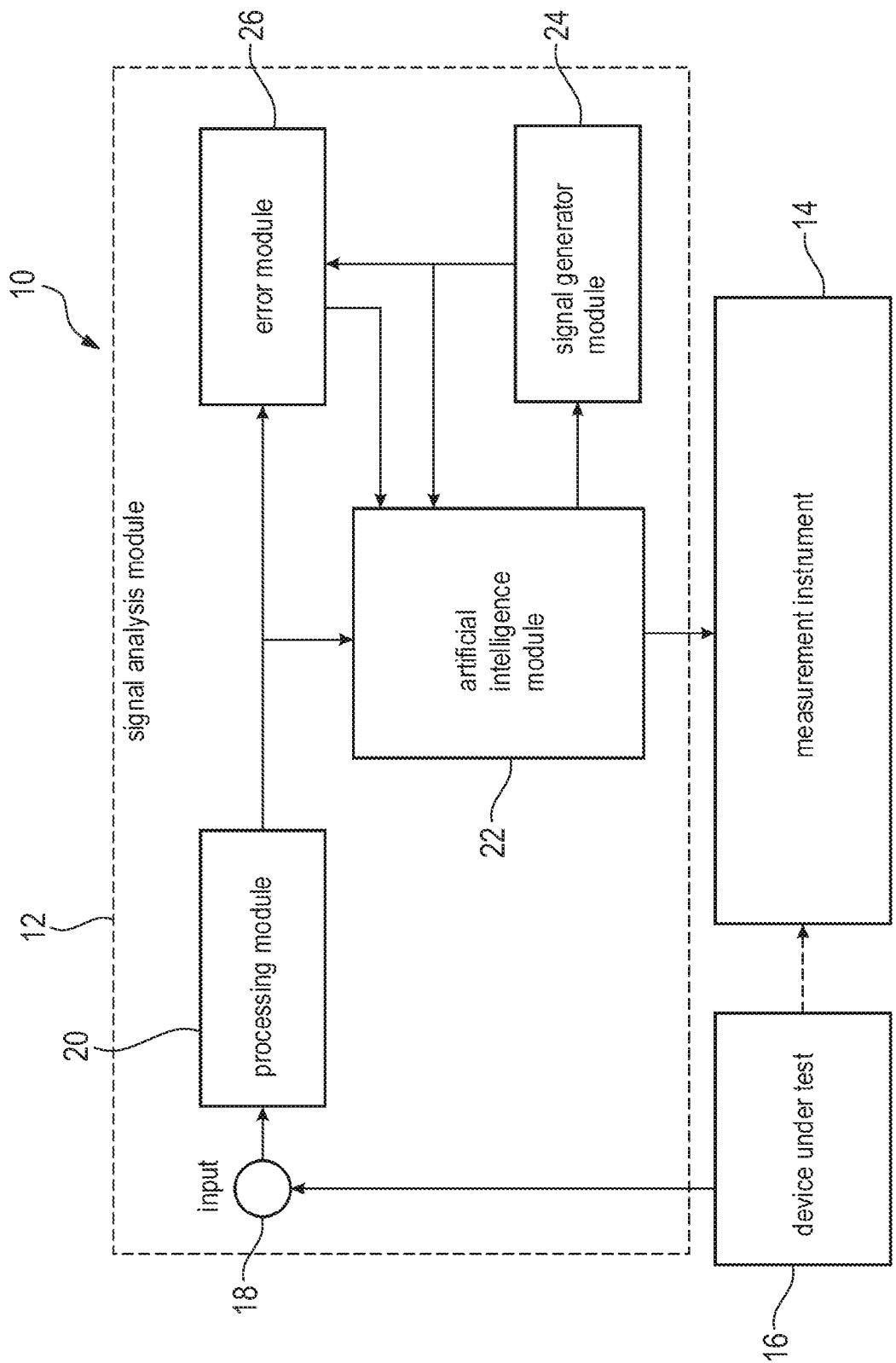
FIG. 1 schematically shows a block diagram of a signal analysis module, including one or more circuits, according to the present disclosure.

FIG. 1 schematically shows a signal analysis system 10 comprising a signal analysis circuit(s) or module 12, a measurement instrument 14, and a device under test 16.

Generally, the term "module" includes suitable hardware, suitable software, or a combination of hardware and software that is configured to have certain functionality.

In FIG. 1, the signal analysis module 12 is established separately from the measurement instrument 14. For example, the signal analysis module 12 may be established as a suitable measurement device, e.g. as an oscilloscope, as a signal analyzer, or as a computer with suitable software. However, in other embodiments, the signal analysis module 12 may also be integrated into the measurement instrument 14.

In general, the measurement instrument 14 is configured to analyze an output signal generated by the device under test 16, as is indicated by the dotted arrow in FIG. 1.

In some embodiments, the measurement instrument 14 is configured to analyze the output signal of the device under test 16 with regard to perturbations and imperfections comprised in the input signal, such as jitter, noise, an error vector magnitude of the output signal, and/or with regard to other signal properties. In other words, the measurement instrument 14 is configured to analyze the quality of the input signal.

For example, the measurement instrument 14 is established as one of an oscilloscope, a vector network analyzer, a (vector) signal analyzer, and a computer with a suitable measurement application.

The device under test 16 may be any electronic device being configured to generate a modulated output signal comprising a symbol sequence, for example wherein the modulated output signal has a predefined frequency or a predefined frequency spectrum. For example, the device under test 16 is configured to generate the output signal and transmit the output signal via GSM, 3G, 4G, 5G, or based on other wireless communication technologies, such as WLAN or Bluetooth.

In the embodiment shown, the signal analysis module 12 comprises an input 18, a processing circuit or module 20, an artificial intelligence circuit or module 22, a signal generator circuit or module 24, and an error circuit or module 26.

The input 18 is connected to the device under test 16 in a signal transmitting manner Therein and in the following, the term "connected in a signal transmitting manner" is understood to denote a cable-based or wireless connection that is configured to transmit signals between the respective devices or components.

Accordingly, the device under test 16 may be connected to the input 18 via a cable or in a wireless manner. In the latter case, the input 18 may comprise suitable electronic components for receiving a wireless signal transmitted by the device under test 16.

The processing module 20 is connected to the input 18 in a signal transmitting manner. The processing module 20 is connected to each of the error module 26 and the artificial intelligence module 22 in a signal transmitting manner. Moreover, the artificial intelligence module 22 is connected to each of the signal generator module 24, the error module 26, and the measurement instrument 14 in a signal transmitting manner Additionally, the signal generator module 24 is connected to the error module 26 in a signal transmitting manner.

Figure 2:
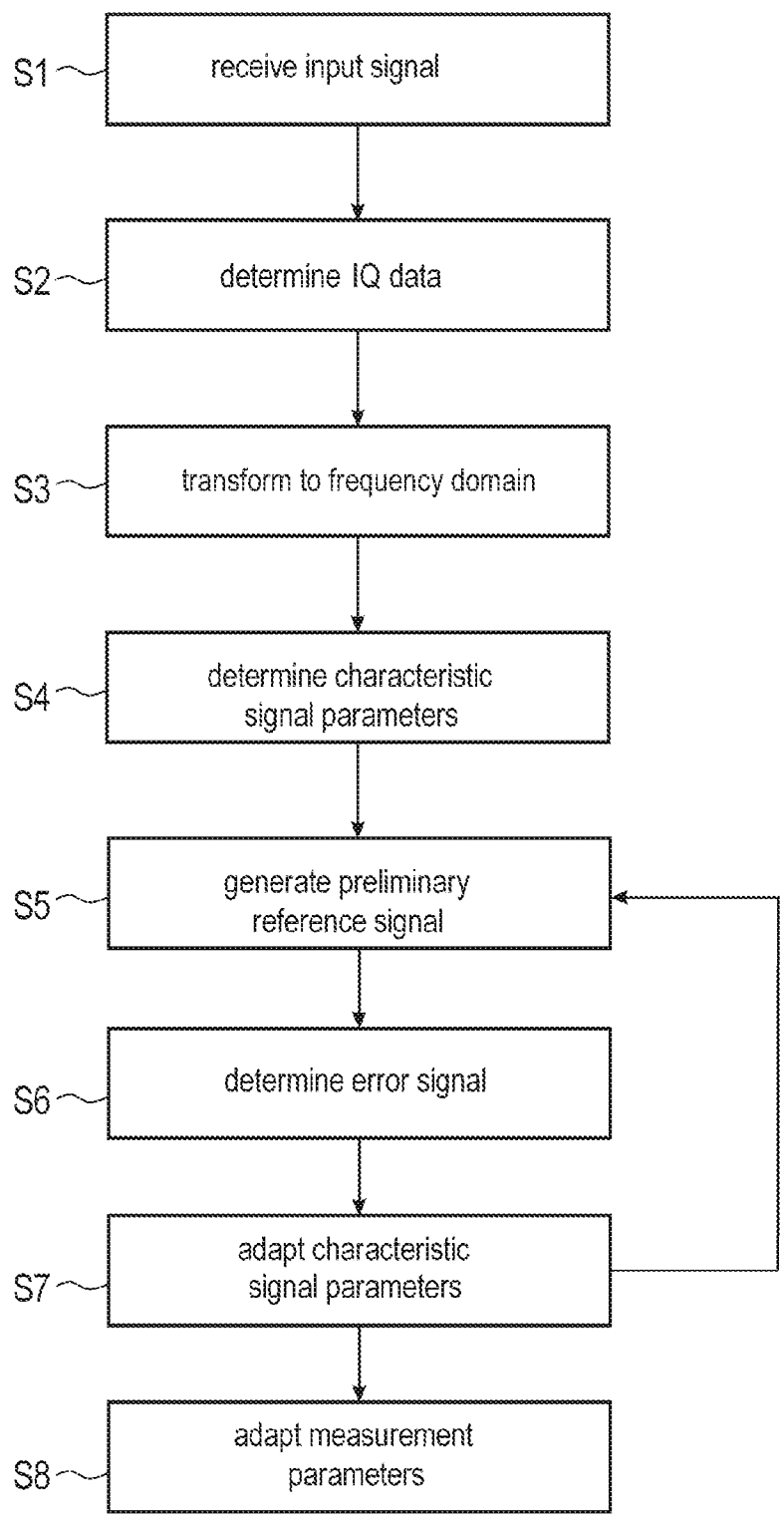
FIG. 2 shows a flow chart of a signal analysis method according to an embodiment of the present disclosure.

Generally speaking, the signal analysis module 12 is configured to automatically set the correct operational mode of the measurement instrument 14 even if signal properties that are relevant for the analysis of the output signal generated by the device under test 16 are not known. More precisely, the signal analysis module 12 is configured to perform a signal analysis method that is described in the following with reference to FIG. 2.

An input signal having unknown characteristic signal parameters is received by the input 18 (step S1). Generally, the characteristic signal parameters correspond to properties of the signal that need to be known in order to analyze the input signal with high accuracy.

In some embodiments, the characteristic signal parameters comprise one or more of the following parameters: a modulation type of the input signal, a frequency offset of the input signal, a symbol rate of the input signal, a phase offset of the input signal, a timing offset of the input signal, and a transmit filter being associated with the input signal.

Therein, the input signal corresponds to the output signal being generated by the device under test 16, which has been transmitted to the input 18 over the air or via a cable.

The received input signal is forwarded to the processing module 20. IQ data being associated with the input signal is determined by the processing module 20 (step S2). The IQ data comprises both in-phase data (I-data) and quadrature data (Q-data).

The determined IQ data is forwarded to the artificial intelligence module 22. Optionally, the IQ data may also be forwarded to the error module 26.

Moreover, the input signal and/or the determined IQ data is transformed to frequency domain by the processing module 20, thereby generating a transformed signal (step S3).

In other words, a spectrum of the input signal and/or a spectrum of the IQ data is determined automatically by the processing module 20.

The transformed signal is forwarded to the artificial intelligence module 22. Additionally, the processing module 20 may also forward the input signal to the error module 26, possibly after certain pre-processing steps such as sampling. The artificial intelligence module 22 automatically determines the at least one characteristic signal parameter of the input signal, for example all characteristic signal parameters mentioned above (step S4).

Step S4 is described in more detail in the following with reference to FIGS. 3-6. A symbol rate of the input signal is determined by the artificial intelligence module 22 based on the transformed signal.

Figure 3:
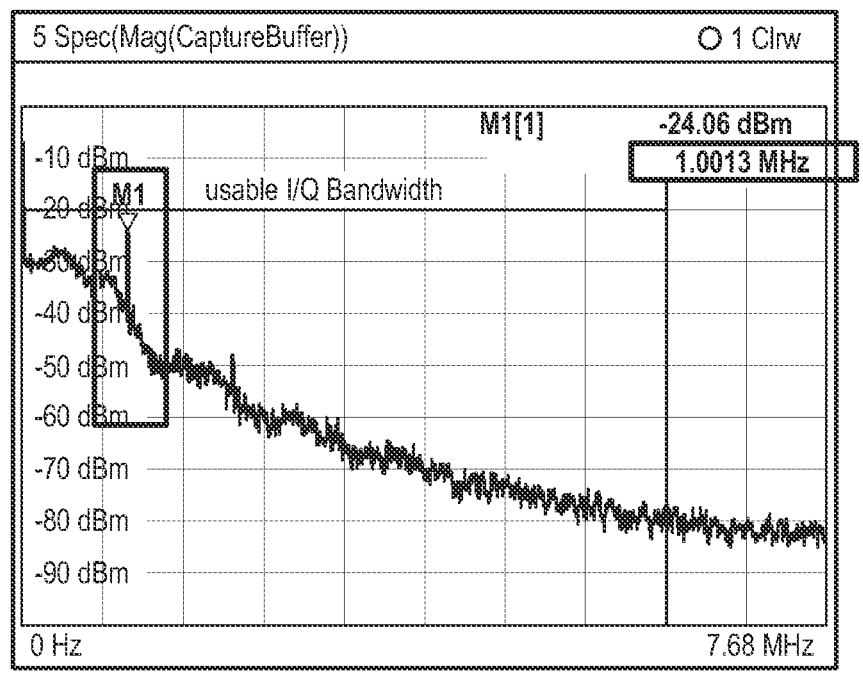
FIGS. 3 to 6 show illustrations of individual steps of the representative signal analysis method of FIG. 2.

As illustrated in FIG. 3, the symbol rate of the input signal is located at a local maximum M1 of the spectrum of the input signal or rather of the spectrum of the IQ data being associated with the input signal. Accordingly, the artificial intelligence module 22 may determine the local maximum M1 in order to determine the symbol rate of the input signal.

The artificial intelligence module 22 may determine the local maximum M1 by classical algorithms or by machine learning techniques, such as pattern recognition and/or image analysis.

In some embodiments, an image of the spectrum of the input signal and/or an image of the spectrum of the IQ data may be generated by the processing module 20 based on the transformed signal. The artificial intelligence module 22 may apply image analysis techniques to the generated image in order to determine the local maximum, and thus the symbol rate of the input signal.

Figures 4A, 4B:
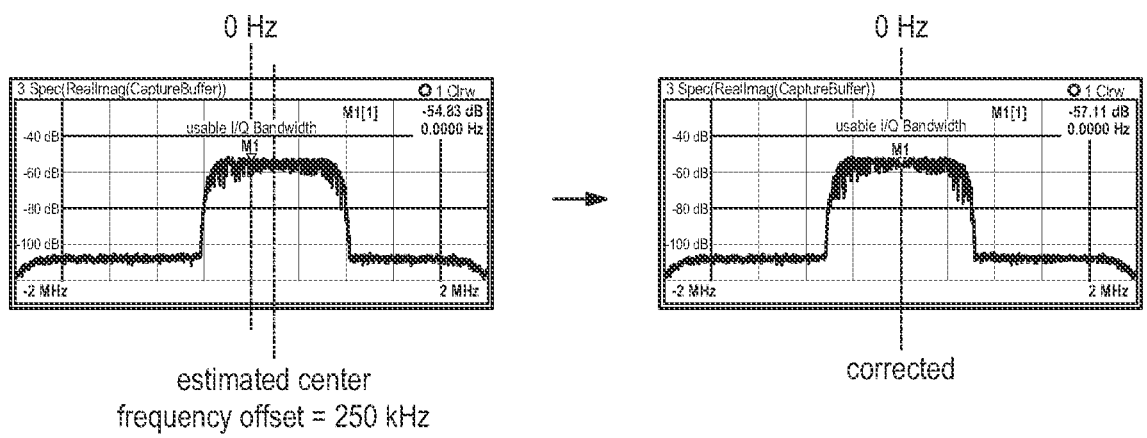

As is illustrated in FIG. 4A, the artificial intelligence module may determine a frequency offset or rather a center frequency offset of the input signal based on the transformed signal.

Analogous to the determination of the symbol rate, the artificial intelligence module 22 may employ classical algorithms and/or machine learning techniques in order to determine the (center) frequency offset of the input signal.

As shown in FIG. 4B, the artificial intelligence module 22 may automatically correct for the determined frequency offset of the input signal. In some embodiments, the artificial intelligence module 22 may automatically correct the IQ data for the (center) frequency offset.

Figure 5A:
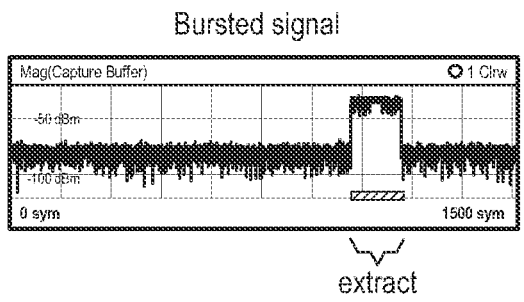
Figure 5B:
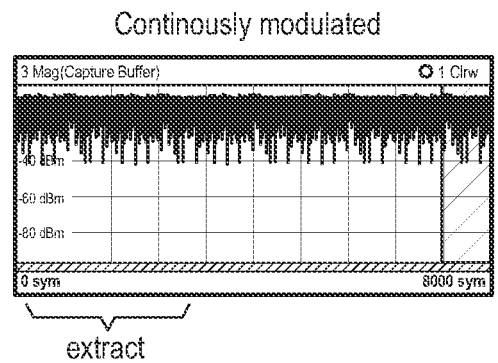

As is shown in FIGS. 5A and 5B, the artificial intelligence module 22 may automatically extract portions of the input signal having a valid modulation and may classify the input signal based on the extracted portions.

In some embodiments, the artificial intelligence module 22 may automatically classify the input signal into one of the following categories: burst-signal, continuously modulated signal, and pure noise.

Two examples are illustrated in FIGS. 5A and 5B, which respectively show a plot of an amplitude of the input signal against time, wherein the time is given in units of a symbol length ("sym").

In the example of FIG. 5A, the input signal is a burst-signal. The artificial intelligence module 22 may automatically identify and extract portions of the input signal that correspond to the individual bursts. Based on the extracted portion(s), the artificial intelligence module 22 may classify the input signal as a burst-signal.

In the example of FIG. 5B, the input signal is a continuously modulated signal. The artificial intelligence module 22 may automatically identify and extract portions of the input signal having a valid modulation. Based on the extracted portion(s), the artificial intelligence module 22 may classify the input signal as a continuously modulated signal.

Moreover, the artificial intelligence module 22 may automatically determine a modulation type or at least a preliminary modulation type of the input signal based on the input signal and/or based on the IQ data. In general, the preliminary modulation type corresponds to a hypothesis about the modulation type of the input signal. This will be explained in more detail below.

The processing module 20 may determine a constellation diagram of the input signal based on the IQ data being associated with the input signal. The artificial intelligence module 22 may then automatically determine the modulation type of the input signal based on the constellation diagram. In general, the constellation diagrams for different modulation types are different from each other. By implication, the modulation type of the input signal can be determined based on the constellation diagram.

The artificial intelligence module 22 may employ classical algorithms and/or machine learning techniques in order to determine the modulation type based on the constellation diagram. In some embodiments, the artificial intelligence module 22 may determine the modulation type of the input signal via pattern recognition techniques that are applied to the constellation diagram.

For example, an image may be generated based on the constellation diagram by the processing module 20. The artificial intelligence module may apply an image analysis technique to the generated image in order to determine the modulation type of the input signal.

Alternatively or additionally, the artificial intelligence module 22 may determine the modulation type of the input signal directly based on the IQ data, for example via suitable machine learning techniques.

The artificial intelligence module 22 may further determine at least one filter parameter of a transmit filter that is associated with the input signal. The input signal is generated by the device under test 16 based on a certain transmit filter having certain filter parameters. In some embodiments, the at least one filter parameter comprises a roll-off factor.

Accordingly, the artificial intelligence module 22 may automatically determine the filter parameters of the transmit filter employed by the device under test 16. This will be described in more detail below.

Summarizing, the signal analysis module 12 determines the characteristic signal parameters of the input signal based on the input signal, the IQ data, and the transformed signal, by automatically extracting relevant features and properties of the input signal as described above.

However, the characteristic signal parameters determined via the signal analysis method described above may be only an estimate of the real characteristic signal parameters of the input signal.

Thus, the signal analysis module 12 may be configured to recursively refine the characteristic signal parameters in order to better match the real characteristic signal parameter of the input signal, as is described in the following with reference to FIG. 6.

Figure 6:
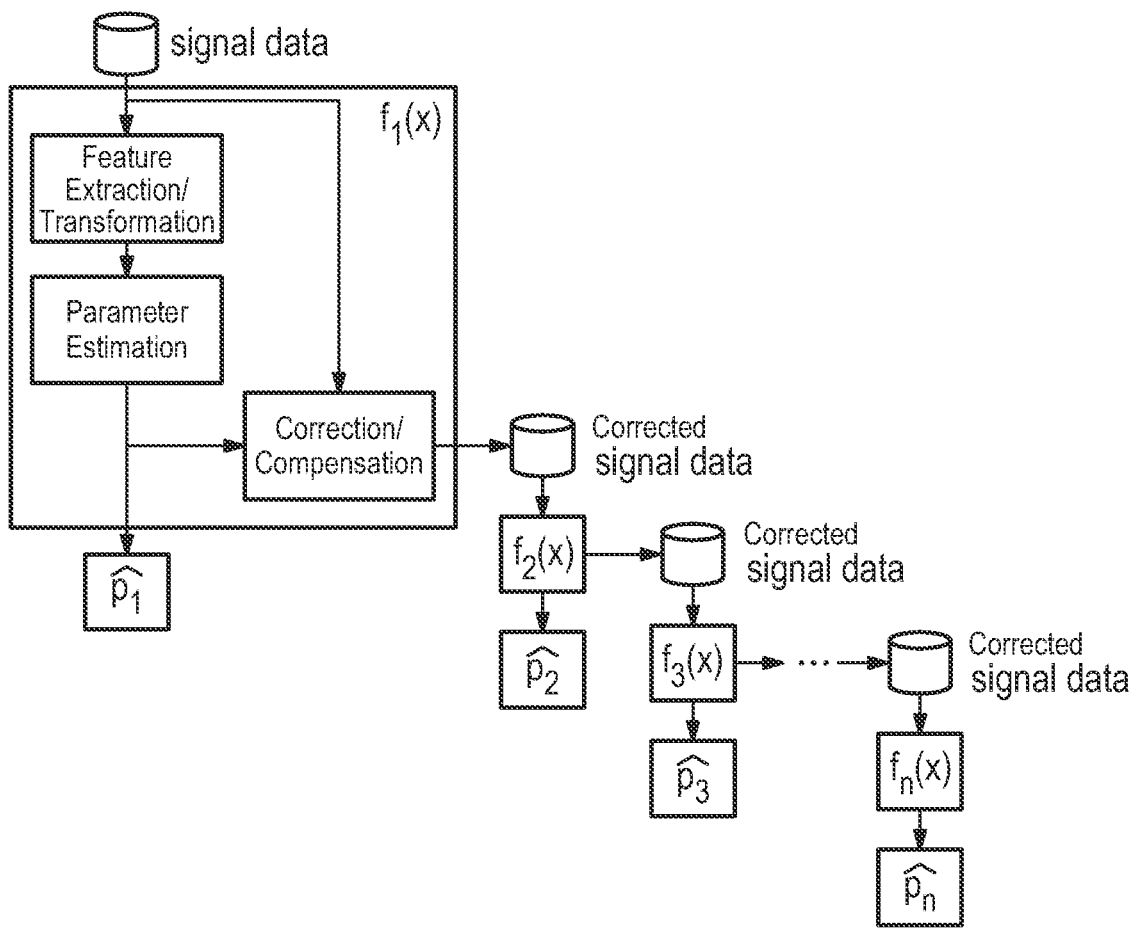

In FIG. 6, the steps of the signal analysis method described above are summarized in the box labelled with $f_1(x)$. Based on the input signal, the IQ data, and the transformed signal (summarized as "signal data" in FIG. 6), the artificial intelligence module 22 determines a first set $\widehat{p_1}$ of estimated characteristic signal parameters via the steps S1 to S4 described above.

Based on the first set $\widehat{p_1}$ of characteristic signal parameters, a first preliminary reference signal $f_1(x)$ is generated by the signal generator module 24 (step S5). Generally speaking, the first preliminary reference signal $f_1(x)$ corresponds to an idealized reconstructed input signal, wherein the input signal is reconstructed based on the first set $\widehat{p_1}$ of determined characteristic signal parameters. In other words, the first preliminary reference signal $f_1(x)$ is a hypothesis about the input signal without any perturbations, and thus about the output signal generated by the device under test 16 without any perturbations.

The first preliminary reference signal $f_1(x)$ may be generated based on a mathematical model of the input signal, wherein the characteristic signal parameters of the first set $\widehat{p_1}$ serve as model parameters of the mathematical model.

As is indicated by the arrows in FIG. 1, the first preliminary reference signal $f_1(x)$ is forwarded to both the error module 26 and to the artificial intelligence module 22. The error module determines an error signal based on the first preliminary reference signal $f_1(x)$ and based on the input signal (step S6).

The error signal corresponds to a difference between the input signal and the first preliminary reference signal $f_1(x)$. Thus, the error signal constitutes a measure for the accuracy of the determined characteristic signal parameters.

Based on the first preliminary reference signal $f_1(x)$ and based on the error signal, the first set of characteristic signal parameters may be adapted or rather fine-tuned by the artificial intelligence module 22 (step S7). For example, the at least one filter parameter of the transmit filter may be determined or rather adapted based on the first preliminary reference signal $f_1(x)$.

As already mentioned above, the first preliminary reference signal $f_1(x)$ is associated with a mathematical model of the input signal, wherein the transmit filter is part of that mathematical model. By implication, the model parameters of the mathematical model, for example the filter parameters of the transmit filter, can be determined by comparing the input signal with the preliminary reference signal.

In some embodiments, the at least one filter parameter may be varied such that a deviation of the first preliminary reference signal from the actual input signal is reduced, for example minimized.

Moreover, the determined modulation type of the input signal may be adapted based on the first preliminary reference signal $f_1(x)$ by comparing a constellation diagram corresponding to the first preliminary reference signal $f_1(x)$ against the constellation diagram being associated with the input signal. In other words, the IQ data associated with the input signal is compared against IQ data being associated with the first reference signal $f_1(x)$ having a preliminary modulation type.

If the constellations diagrams do not match, then the first preliminary reference signal $f_1(x)$ may be based on a wrong preliminary modulation type. Accordingly, the modulation type of the first preliminary reference signal has to be adapted.

In order to determine the deviation of the constellation diagram that is based on the preliminary modulation of the first preliminary reference signal $f_1(x)$ from the constellation diagram being associated with the input signal, an error vector magnitude (EVM) of the IQ data being associated with the preliminary modulation may be determined with respect to the IQ data being associated with the input signal.

As a result of the steps S5 to S7 described above, a second set of characteristic signal parameters $\widehat{p_2}$ is obtained, which correspond to a more accurate estimate of the real characteristic signal parameters of the input signal.

Steps S5 to S7 may then be repeated based on the second set of characteristic signal parameters $\widehat{p_2}$, thereby obtaining a third set of characteristic signal parameters $\widehat{p_3}$, which correspond to an even more accurate estimate of the real characteristic signal parameters of the input signal.

Steps S5 to S7 may be repeated several times, thereby obtaining a final set of characteristic signal parameters $\widehat{p_n}$ after (n−1) iterations of the steps S5 to S7, wherein n is an integer bigger than 1.

Alternatively, at least one individual signal parameter may be determined in each iteration of steps S5 to S7, while the remaining signal parameters may remain unknown (in that iteration).

Without restriction of generality, e.g. the symbol rate may be determined in the first iteration. In other words, $\widehat{p_1}$ in FIG. 6 would then correspond to the symbol rate of the input signal.

In the second iteration, a second signal parameter $\widehat{p_2}$ is determined based on the first signal parameter $\widehat{p_1}$, which may e.g. be the type of transmit filter being associated with the input signal.

In a third iteration, a third signal parameter $\widehat{p_3}$ is determined based on the first signal parameter $\widehat{p_1}$ and based on the second signal parameter $\widehat{p_2}$, which may be the roll-off factor of the transmit filter, etc.

At least one measurement parameter of the measurement instrument 14 is automatically adapted based on the final set of characteristic signal parameters $\widehat{p_n}$ by the artificial intelligence module 22 (step S8).

In other words, the measurement instrument 14 is automatically set to the correct measurement mode for analyzing the input signal.

Summarizing, the artificial intelligence module 22 automatically analyzes the input signal having unknown characteristic signal parameters, and automatically determines the unknown characteristic signal parameters necessary for a substantive analysis of the input signal.

Moreover, the artificial intelligence module 22 automatically sets the measurement instrument to the correct operational mode for the analysis of the input signal.

For this purpose, the artificial intelligence module 22 may use classical algorithms and/or machine learning techniques in order to determine the characteristic signal parameters and in order to adapt the measurement parameters of the measurement instrument 14, for example pattern recognition techniques, image analysis techniques and/or reinforcement learning techniques.

In some embodiments, if the artificial intelligence module 22 is configured for reinforcement learning techniques, the artificial intelligence module 22 acts as an agent, while the measurement instrument 14 is the environment.

Accordingly, the user of the measurement instruments does not have to go through a potentially time-consuming process of manually recovering the characteristic properties of the input signal having unknown properties. Instead, the characteristic properties of the input signal are recovered automatically and the measurement instrument 14 is automatically set to the correct operational mode.

Certain embodiments disclosed herein utilize circuitry (e.g., one or more circuits) in order to implement standards, protocols, models, methodologies or technologies disclosed herein, operably couple two or more components, generate information, process information, analyze information, generate signals, encode/decode signals, convert signals, transmit and/or receive signals, control other devices, etc. Circuitry of any type can be used. It will be appreciated that the term "information" can be use synonymously with the term "signals" in this paragraph.

In an embodiment, circuitry includes, among other things, one or more computing devices such as a processor (e.g., a microprocessor), a central processing unit (CPU), a digital signal processor (DSP), an application-specific integrated circuit (ASIC), a field-programmable gate array (FPGA), a system on a chip (SoC), or the like, or any combinations thereof, and can include discrete digital or analog circuit elements or electronics, or combinations thereof. In an embodiment, circuitry includes hardware circuit implementations (e.g., implementations in analog circuitry, implementations in digital circuitry, and the like, and combinations thereof).

In an embodiment, circuitry includes combinations of circuits and computer program products having software or firmware instructions stored on one or more computer readable memories that work together to cause a device to perform one or more protocols, methodologies or technologies described herein. In an embodiment, circuitry includes circuits, such as, for example, microprocessors or portions of microprocessor, that require software, firmware, and the like for operation. In an embodiment, circuitry includes one or more processors or portions thereof and accompanying software, firmware, hardware, and the like.

In some examples, the functionality described herein can be implemented by special purpose hardware-based computer systems or circuits, etc., or combinations of special purpose hardware and computer instructions.

Of course, in some embodiments, two or more of these components, or parts thereof, can be integrated or share hardware and/or software, circuitry, etc. In some embodiments, these components, or parts thereof, may be grouped in a single location or distributed over a wide area. In circumstances were the components are distributed, the components are accessible to each other via communication links.

Various embodiments of the present disclosure or the functionality thereof may be implemented in various ways, including as non-transitory computer program products. A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, program code, computer program instructions, and/or similar terms used herein interchangeably). Such non-transitory computer-readable storage media include all computer-readable media (including volatile and non-volatile media).

Embodiments of the present disclosure may also take the form of an apparatus, system, computing device, computing entity, and/or the like executing instructions stored on computer-readable storage media to perform certain steps or operations. The computer-readable media include cooperating or interconnected computer-readable media, which exist exclusively on a processing or processor system or distributed among multiple interconnected processing or processor systems that may be local to, or remote from, the processing or processor system. However, embodiments of the present disclosure may also take the form of an entirely hardware embodiment performing certain steps or operations.

Some embodiments are described above with reference to block diagrams and/or flowchart illustrations of apparatuses, methods, systems, and/or computer program instructions or program products. It should be understood that each block of any of the block diagrams and/or flowchart illustrations, respectively, of portions thereof, may be implemented in part by computer program instructions, e.g., as logical steps or operations executing on one or more computing devices. These computer program instructions may be loaded onto one or more computer or computing devices, such as special purpose computer(s) or computing device(s) or other programmable data processing apparatus(es) or processors to produce a specifically-configured machine, such that the instructions which execute on one or more computer or computing devices or other programmable data processing apparatus or processor implement the functions specified in the flowchart block or blocks and/or carry out the methods described herein.

These computer program instructions may also be stored in one or more computer-readable memory or portions thereof, such as the computer-readable storage media described above, that can direct one or more computers or computing devices or other programmable data processing apparatus(es) or processors to function in a particular manner, such that the instructions stored in the computer-readable memory produce an article of manufacture including computer-readable instructions for implementing the functionality specified in the flowchart block or blocks.

The computer program instructions may also be loaded onto one or more computers or computing devices or other programmable data processing apparatus(es) or processors to cause a series of operational steps to be performed on the one or more computers or computing devices or other programmable data processing apparatus(es) or processors to produce a computer-implemented process such that the instructions that execute on the one or more computers or computing devices or other programmable data processing apparatus(es) or processors provide operations for implementing the functions specified in the flowchart block or blocks and/or carry out the methods described herein.

It will be appreciated that the term computer or computing device can include, for example, any computing device or processing structure, including but not limited to a processor (e.g., a microprocessor), a central processing unit (CPU), a digital signal processor (DSP), an application-specific integrated circuit (ASIC), a field-programmable gate array (FPGA), a system on a chip (SoC), or the like, or any combinations thereof.

Accordingly, blocks of the block diagrams and/or flowchart illustrations support various combinations for performing the specified functions, combinations of operations for performing the specified functions and program instructions for performing the specified functions. Again, it should also be understood that each block of the block diagrams and flowchart illustrations, and combinations of blocks in the block diagrams and/or flowchart illustrations, or portions thereof, could be implemented by special purpose hardware-based computer systems or circuits, etc., that perform the specified functions or operations, or combinations of special purpose hardware and computer instructions.

According to some embodiments, many individual steps of a process may or may not be carried out utilizing computer or computing based systems described herein, and the degree of computer implementation may vary, as may be desirable and/or beneficial for one or more particular applications.

The present application may reference quantities and numbers. Unless specifically stated, such quantities and numbers are not to be considered restrictive, but exemplary of the possible quantities or numbers associated with the present application. Also in this regard, the present application may use the term "plurality" to reference a quantity or number. In this regard, the term "plurality" is meant to be any number that is more than one, for example, two, three, four, five, etc. The terms "about," "approximately," "near," etc., mean plus or minus 5% of the stated value. For the purposes of the present disclosure, the phrase "at least one of A and B" is equivalent to "A and/or B" or vice versa, namely "A" alone, "B" alone or "A and B.". Similarly, the phrase "at least one of A, B, and C," for example, means (A), (B), (C), (A and B), (A and C), (B and C), or (A, B, and C), including all further possible permutations when greater than three elements are listed.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The embodiments of the invention in which an exclusive property or privilege is claimed are defined as follows:

1. A signal analysis method, comprising:
   receiving an input signal having unknown characteristic signal parameters;
   determining IQ data being associated with said input signal;
   determining at least one of said characteristic signal parameters based on said IQ data via an artificial intelligence circuit; and
   adapting at least one measurement parameter of a measurement instrument based on said at least one characteristic parameter by said artificial intelligence circuit, such that the measurement instrument is automatically set to the correct operational mode for the analysis of the input signal,
   wherein a preliminary reference signal is generated based on said at least one characteristic signal parameter, and wherein said preliminary reference signal is compared with said input signal in order to adapt said at least one measurement parameter.

2. The signal analysis method of claim 1, wherein at least one of said input signal and said IQ data is transformed to frequency domain, thereby generating a transformed signal.

3. The signal analysis method of claim 2, wherein a local maximum of said transformed signal is determined by said artificial intelligence circuit in order to determine a symbol rate of said input signal.

4. The signal analysis method of claim 1, wherein a modulation type of the input signal is determined directly based on said IQ data by said artificial intelligence circuit.

5. The signal analysis method of claim 1, wherein a constellation diagram is determined based on said IQ data, and wherein a modulation type of the input signal is determined by said artificial intelligence circuit.

6. The signal analysis method of claim 1, wherein said preliminary reference signal is generated based on at least one preliminary modulation type, and wherein a constellation diagram determined based on said IQ data is compared against a constellation diagram corresponding to said preliminary reference signal in order to determine said modulation type of said input signal.

7. The signal analysis method of claim 1, wherein an error signal is determined based on said input signal and based on said preliminary reference signal, and wherein said at least one measurement parameter is adapted based on said error signal.

8. The signal analysis method of claim 1, wherein at least one filter parameter of a transmit filter is determined based on said preliminary reference signal.

9. The signal analysis method of claim 8, wherein said at least one filter parameter comprises a roll-off factor.

10. The signal analysis method of claim 1, wherein an error vector magnitude of said IQ data is determined, and wherein said at least one measurement parameter is adapted based on said error vector magnitude by said artificial intelligence circuit.

11. A signal analysis circuit, comprising:
   an input configured to receive an input signal having unknown characteristic signal parameters;
   a processing circuit configured to determine IQ data being associated with said input signal;
   an artificial intelligence circuit configured to determine at least one of said characteristic signal parameters based on said IQ data, and configured to adapt at least one measurement parameter of a measurement instrument based on said at least one characteristic parameter, such that the measurement instrument is automatically set to the correct operational mode for the analysis of the input signal;
   a signal generator circuit being configured to generate a preliminary reference signal based on said at least one characteristic signal parameter, and wherein said artificial intelligence circuit is configured to compare said preliminary reference signal with said input signal in order to adapt said at least one measurement parameter, and
   an error circuit configured to determine an error signal based on said input signal and based on said preliminary reference signal, and wherein said artificial intelligence circuit is configured to adapt said at least one measurement parameter based on said error signal.

12. The signal analysis circuit of claim 11, wherein said processing circuit is configured to transform at least one of said input signal and said IQ data to frequency domain, thereby generating a transformed signal.

13. The signal analysis circuit of claim 12, wherein said artificial intelligence circuit is configured to determine a local maximum of said transformed signal in order to determine a symbol rate of said input signal.

14. The signal analysis circuit of claim 11, wherein said processing circuit is configured to determine a constellation diagram based on said IQ data, and wherein said artificial intelligence circuit is configured to determine a modulation type of the input signal based on said constellation diagram.

15. The signal analysis circuit of claim 11, wherein said signal generator circuit is configured to generate said preliminary reference signal based on at least one preliminary modulation type, and wherein said artificial intelligence circuit is configured to compare a constellation diagram based on said IQ data against a constellation diagram corresponding to said preliminary reference signal in order to determine said modulation type of said input signal.

16. The signal analysis circuit of claim 11, wherein said artificial intelligence circuit is configured to determine at least one filter parameter of a transmit filter based on said preliminary reference signal.

17. The signal analysis circuit of claim 16, wherein said at least one filter parameter comprises a roll-off factor.

18. The signal analysis circuit of claim 11, wherein said processing circuit is configured to determine an error vector magnitude of said IQ data, and wherein said artificial intelligence circuit is configured to adapt said at least one measurement parameter based on said error vector magnitude.

19. A signal analysis circuit, comprising:
an input configured to receive an input signal having unknown characteristic signal parameters;
a processing circuit configured to determine IQ data being associated with said input signal; and
an artificial intelligence circuit configured to determine at least one of said characteristic signal parameters based on said IQ data, and configured to adapt at least one measurement parameter of a measurement instrument based on said at least one characteristic parameter,
wherein said signal analysis circuit further comprises a signal generator circuit, said signal generator circuit being configured to generate a preliminary reference signal based on said at least one characteristic signal parameter, and wherein said artificial intelligence circuit is configured to compare said preliminary reference signal with said input signal in order to adapt said at least one measurement parameter,
wherein said signal generator circuit is configured to generate said preliminary reference signal based on at least one preliminary modulation type, and wherein said artificial intelligence circuit is configured to compare a constellation diagram based on said IQ data against a constellation diagram corresponding to said preliminary reference signal in order to determine said modulation type of said input signal.

* * * * *